(12) United States Patent
Hu et al.

(10) Patent No.: US 10,108,696 B1
(45) Date of Patent: *Oct. 23, 2018

(54) UNIT GROUP GENERATION AND RELATIONSHIP ESTABLISHMENT

(71) Applicant: Pinterest, Inc., San Francisco, CA (US)

(72) Inventors: Ningning Hu, San Francisco, CA (US); Tze Way Eugene Ie, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/253,656

(22) Filed: Aug. 31, 2016

Related U.S. Application Data

(63) Continuation of application No. 13/934,813, filed on Jul. 3, 2013, now Pat. No. 9,436,754.

(51) Int. Cl.
*G06F 7/00* (2006.01)
*G06F 17/30* (2006.01)

(52) U.S. Cl.
CPC .............................. *G06F 17/30598* (2013.01)

(58) Field of Classification Search
CPC ...... G06F 7/00; G06F 17/30; G06F 17/30997; G06F 17/30598; G06Q 30/0243
See application file for complete search history.

(56) References Cited

U.S. PATENT DOCUMENTS

| | | | |
|---|---|---|---|
| 8,954,428 | B2 | 2/2015 | Chiliveli et al. |
| 9,436,754 | B1* | 9/2016 | Hu .................... G06F 17/30997 |
| 2005/0119966 | A1 | 6/2005 | Sandholm et al. |
| 2008/0243638 | A1* | 10/2008 | Chan ................. G06F 17/30522 705/14.51 |
| 2008/0313214 | A1 | 12/2008 | Duhig et al. |
| 2009/0222337 | A1* | 9/2009 | Sergiades ........... G06Q 30/0222 705/14.23 |
| 2015/0169645 | A1 | 6/2015 | Li et al. |

* cited by examiner

*Primary Examiner* — Azam Cheema
(74) *Attorney, Agent, or Firm* — Athorus, PLLC

(57) ABSTRACT

This disclosure describes systems and methods for establishing a unit group dictionary based on user provided annotations. The unit group dictionary may be used to identify relationships between multiple items in a corpus. Those relationships may facilitate the display of object identifiers and/or other aspects used and/or provided by the object management service.

18 Claims, 10 Drawing Sheets

UNIT GROUP GENERATION AND RELATIONSHIP ESTABLISHMENT

This application is a continuation of U.S. patent application Ser. No. 13/934,813, filed Jul. 3, 2013, the disclosure of which is incorporated by reference in its entirety.

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products ("e-commerce"), and receive news, just to name a few. Other uses include communicating with social communities, friends and family, photography, and many others.

Objects are typically made available and people search for objects based on information about the object for which they are searching. Keywords that describe an object are often associated with the object and when people search using one or more of those keywords the object may be returned as a result. While this provides a good foundation for searching for objects based on information about the object, it limits the ability for individuals to search for, share, and experience objects in other ways.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
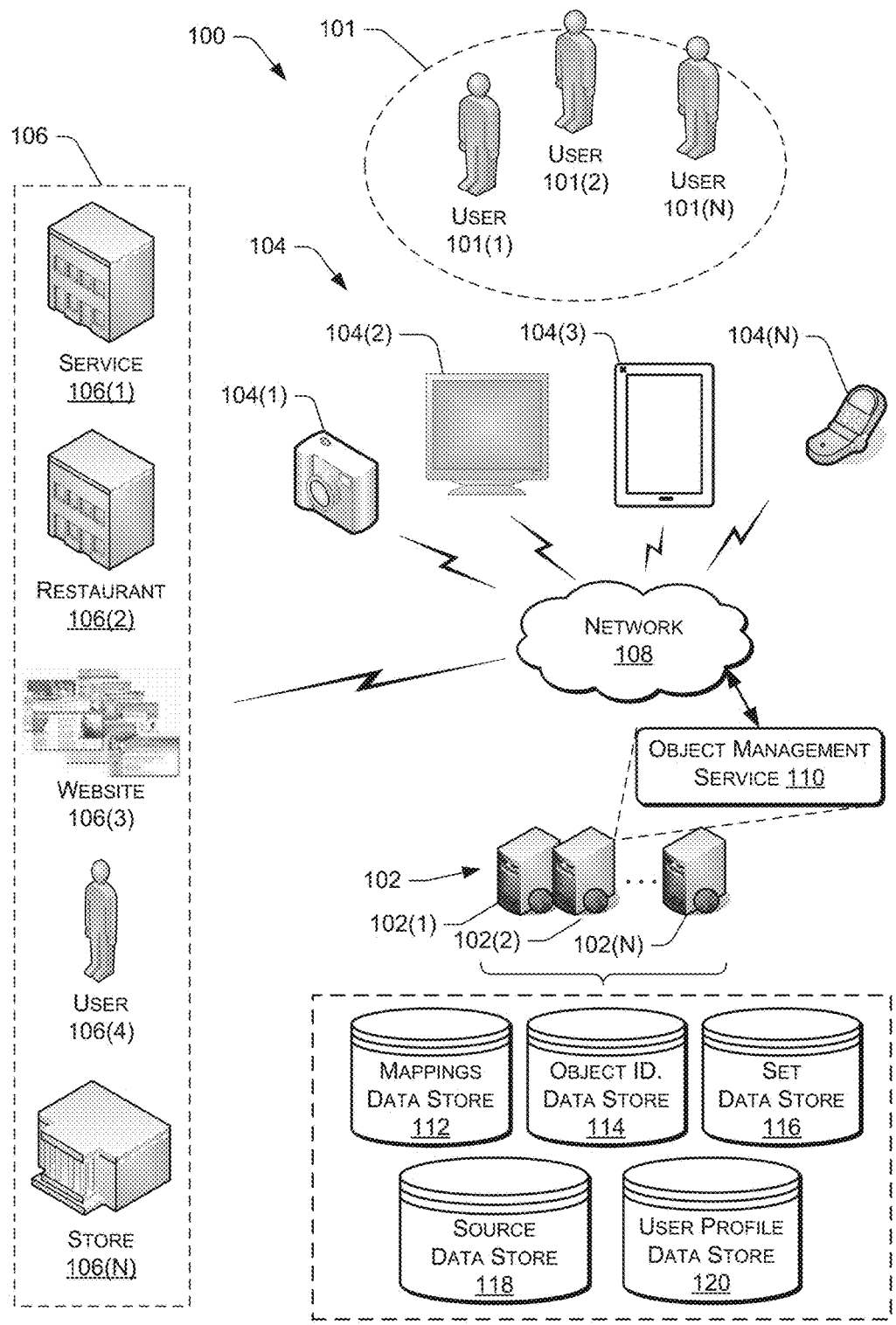
FIG. 1 is a pictorial diagram of an illustrative environment that includes a server system and a client device communicatively connected via a network.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes systems and methods for establishing and relating unit groups from a corpus of information maintained for a group of items, such as representations, object identifiers, sets and/or users. As discussed herein, objects may have vastly different meanings (context) to different individuals based on how they experience the object. For example, Amy, a visitor to New York, may view and experience the Empire State Building as a place she visited. In comparison, Bob, an engineer, may have the context that the Empire State Building is a great engineering achievement. As still another example, Cathy, who works in the Empire State Building, may associate the Empire State Building with the context of her place of work. In each instance, the individuals have a different context for the same object.

In the above example, each user, utilizing the implementations described herein, may create an object identifier for the Empire State Building and provide different annotations about the object that are included in the object identifier and provide context (e.g., places visited, engineering achievement, place of work). Utilizing the annotations for a group of object identifiers, unit groups may be identified and used to relate objects, identify users that have similar interests, likes and/or dislikes, identify potential security threats, and the like. For example, multiple individuals may create object identifiers of a dog and provide some form of the annotation "American Bull Dog" (e.g., "I love my American Bull Dog," "Look at this American Bull Dog," "American Bull Dog at play"). Using the implementations discussed herein, the unit group "American Bull Dog" can be identified and used to relate the different object identifiers and/or users that created those object identifiers.

For purposes of discussion, an "object identifier," as used herein, is a collection of one or more items of information that identifies an object based on a user's perspective, or context. The object identifier may include any combination of: a representation of the object, such as a graphical representation, audible representation, or other representation of the object; a context for the object as understood by the user; a description or annotation of the object provided by the user; static information about the object; supplemental information about the object; the set to which the object belongs (discussed below); the source of the object; any parent object identifier from which the object identifier was created; and any identification of other similar object identifiers. As will be appreciated, additional or fewer items of information may be included in an object identifier.

As discussed in further detail herein, a context represents information about an object as understood by the user. The context explains why the object is important to the user who created the object identifier. In some implementations, context(s) may be provided directly by the user or determined based on other information provided by or about the user, such as annotations. Static information about an object may be any information about the object that does not change. Such information may be provided by the user, by other users, by external sources, and/or by the methods and systems described herein.

The methods and systems described herein further enable users to manage, search for, share and discover objects by organizing object identifiers into "sets." For example, users may create one or more sets and object identifiers may be associated with those sets. Generally, a "set" is a collection of object identifiers created by a user. In one implementation, each set may include any number of object identifiers, including zero (a null set). An object identifier may be associated with one or many sets. In one implementation, an object identifier may only be associated with one set.

Like object identifiers, sets may have a context and/or annotations. A set may also include a category, such as travel, sports, animals, art, education, food and drink, etc. In some implementations, the presentation of the set and corresponding object identifiers may depend on the context, category and/or annotations associated with the set. For example, a set with included object identifiers may be arranged according to their related unit groups. For example, if a set includes eight object identifiers, three of which include the unit group "American Bull Dog," two of which include the unit group "Labrador Retriever," and three of which include the unit group "Doberman Pinscher," the object identifiers may be arranged according to those unit groups.

A "unit" as used herein is any form of a character, symbol, number, and/or other identifier. For example a unit may be a letter, a word, a combination of letters (e.g., lol), a number, a combination of numbers, a combination of letters and numbers, a symbol, a combination of symbols, a combination of letters and symbols, a combination of numbers and symbols, a combination of letters, numbers and symbols, etc. An "item" as used herein, may be any one of an object, a representation, an object identifier, a set, and/or a user. An "annotation" as used herein, may by any information provided by a user and/or an external source.

Users can create object identifiers and add them to sets based on representations for objects provided or identified by the user or by adding existing object identifiers to their own set of object identifiers. An "object" may be anything that can be represented. For example, a user may create an object identifier for a television show, an image, a physical object, a sound, a web page, a location, a digital object, and the like. The user may also provide annotations to describe the identified object. Object identifiers created with representations provided or identified by a user are considered parent object identifier relationships. Object identifiers created based on existing object identifiers are considered child object identifiers, and may in some implementations inherit the annotations of the parent object identifier. An object identifier may have any number of parent and/or child object identifiers.

FIG. 1 is a pictorial diagram of an illustrative environment 100 that includes users 101, such as users 101(1), 101(2)-101(N), a server system 102 that includes one or more server computers 102(1), 102(2)-102(N), one or more client devices 104, such as client device 104(1), 104(2), 104(3)-104(N), and one or more external sources 106, such as a service offering 106(1), restaurant 106(2), web site 106(3), user 106(4)-store 106(N) communicatively connected via a network 108. As will be appreciated, any number and/or type of server systems 102, client devices 104 and/or external source 106 may be included in the environment 100 and those illustrated in FIG. 1 are only exemplary. Likewise, any number of users 101 may be included in the environment 100. For purposes of this discussion, the term "user" will be used herein to refer to an individual interacting with the server system 102 and/or object management service 110 (discussed below).

The network 108 may include a local area network, a wide area network, such as a public switched telephone network (PSTN), a cable television network, a satellite network, a collection of networks, a public Internet protocol network, a private Internet protocol network, or a combination thereof. Moreover, the network 108 may be wired, wireless, or a combination of the two. The server system 102 may also include a mappings data store 112, an object identifier data store 114, a set data store 116, a source data store 118, and a user profile data store 120. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The mappings data store 112, object identifier data store 114, set data store 116, source data store 118, and user profile data store 120 may be integrated with the server system 102 or otherwise communicatively coupled with the server system 102. For example, one or more of the mappings data store 112, object identifier data store 114, set data store 116, source data store 118, and user profile data store 120 may be located at a remote computing resource (not shown) and communicatively coupled with the server system 102. In some implementations, the mappings data store 112, object identifier data store 114, set data store 116, source data store 118, and user profile data store 120 may include one or more CD-RW/DVD-RW drives, hard disk drives, tape drives, or other storage devices that are utilized to store digital content and information. The server system 102, separately or together with the mappings data store 112, object identifier data store 114, set data store 116, source data store 118, and user profile data store 120, may provide an object management service 110 that facilitates user 101 exploration, annotation and/or sharing of object identifiers, creation, management and/or annotation of sets into which one or more object identifiers may be included, adding/updating of supplemental information by external sources 106 and/or the object management service 110, development of a dictionary set of unit groups and/or establishment of relationships between object identifiers, representations, sets and/or users based on the unit groups.

In some implementations, the server system 102 may also be configured to exchange information with one or more external sources 106. The external sources 106 may include any type of entity and/or individual(s) that provides a service, product or information that may be used to supplement an object identifier and/or representation of an object. For example, external sources 106 may include a service offering 106(1), such as local weather, time, streaming video of a location, etc., restaurants 106(2), websites 106(3), users 106(4) and stores 106(N), such as a toy store, grocery store, electronic commerce (e-commerce) store, book store, etc. External sources may be associated with a fixed location(s), such as their place of business, a location that may change (e.g., hiking guide, mobile health provider) depending on the external sources' current location, or no location at all (e.g., digital or virtual business). Digital or virtual businesses, such as websites 106(3), include any form of e-commerce or other digital offering that may provide supplemental information.

For example, an e-commerce site may provide a shopping cart or purchase button, also referred to herein as a buy button, (supplemental information) that can be used to initiate an action to purchase the object. A user, when viewing the object identifier that includes a representation of the object with which the e-commerce site has associated a purchase button, may interact with that supplemental information and initiate a purchase of the object represented by the object identifier.

In some implementations, the external source 106 may interact with the object management service 110 and provide representations for objects along with supplemental information and/or annotations that could then be used to form object identifiers for users. For example, if the external source 106 is a boutique home furnishing store, the home furnishing store may provide graphical representations for each object they offer for sale in the store along with annotations describing each object.

Returning to FIG. 1, client devices 104 may include personal computers, tablet computers, eBook reader devices, laptop computers, desktop computers, netbooks, personal digital assistants (PDA), portable gaming devices, wireless communication devices, such as smart phones or mobile handsets, set-top-boxes, game consoles, cameras, audio recorders/players, or any combination thereof. As will be described with regard to the implementations shown herein, the server system 102 is configured to exchange data and information, including information about users, sets, representations, object identifiers, and other like information with the client device 104. For example, the object management service 110 may interact via the server system 102 to determine a user's location, provide representations of objects near the user's location, enable a user to select a representation of an object, create an object identifier, add annotations and/or include that object identifier in a user's set of object identifiers.

Likewise, a user 101 may interact with the object management service 110, via a client device 104, to create, discover, view and/or annotate object identifiers and sets of object identifiers, obtain information about (or purchase) objects identified by an object identifier, and/or to communicate with others. For example, a user 101, Steve in this example, may submit a request to create an object identifier for a race car by providing an image (representation) of the race car and add that object identifier to his set called Birthday Celebration. The user, Steve, may provide an annotation, such as "The race car I drove for my birthday present!" for inclusion in the object identifier. The client device 104 may determine and provide the user's location information and the request to the object management service 110. The object management service 110 may receive the information, determine a context for the object identifier based on the representation, the annotation provided by Steve, the context associated with the set with which the object identifier is to be associated, and optionally the location information. For example, the object management service 110 may utilize an existing dictionary for the corpus of objects and identify the unit groups "race car" and "birthday present" included in the annotations provided by Steve. Utilizing this information, the object management service may relate the object identifier to other object identifiers that include similar unit groups. In this example, the object management service 110 may also determine based on the identified unit groups that the context for the object identifier is birthdays and/or special events. An object identifier that includes the representation, annotation and/or context(s) may then be established by the object management service 110 and associated with Steve's set of object identifiers called Birthday Celebration.

In some implementations, object identifiers and/or sets may also be presented differently based on the unit groups identified in the annotations of those object identifiers and/or sets. For example, if there are multiple object identifiers in a set, those that are related based on units groups may be presented together. Likewise, sets with similar unit groups and/or that include object identifiers with similar unit groups may also be presented together.

The mappings data store 112 stores information about the relationships between object identifiers, sets, users, representations and external sources that provide supplemental information. Likewise, the unit groups, such as a dictionary of unit groups may also be maintained in the mapping data store 112. For example, for each object identifier, a relationship with other object identifiers based on unit groups may be maintained. Likewise, if the object identifier was added to a user's set from another object identifier, not only is the relationship between the user's set and the object identifier maintained, a link or relationship between the prior object identifier (the parent) and the current object identifier is also maintained. In some implementations, there may be a chain of relationships/links between multiple object identifiers, each link representing a parent object identifier from which the current object identifier was created.

For example, user A may create an object identifier representing the Empire State Building and include an image of the Empire State Building (representation) taken by user A. That object identifier may be associated with user A's set of object identifiers called "Buildings I Visited on Vacation." User A may also provide an annotation for the object identifier, such as "Visited the Empire State Building on day 1." The object management service 110 may compare the annotation with an existing dictionary of unit groups, identify the unit group "Empire State Building" and generate relationships between the object identifier and other object identifiers and/or sets with the same unit group.

User B may view user A's object identifier and create their own object identifier by selecting to add user A's object identifier to one of user B's sets of object identifiers. In this example, a new object identifier is created for user B that includes the representation of the Empire State Building from user A's object identifier and is associated with one of user B's sets. User B may utilize the annotation provided by user A and/or add his/her own annotation. A link or other relationship between user A's object identifier and user B's object identifier is maintained in the mappings data store 112. Likewise, relationships with other object identifiers having the same unit group(s) may also be maintained.

The object identifier data store 114 maintains information about each object identifier created by the object management service 114. For example, for each object identifier the object management service 110 may store in the object identifier data store 114 information as to the representation included in the object identifier, the set to which the object identifier is associated, the user that created the object identifier, the context for the object identifier, any provided annotations for the object identifier, any supplemental information associated with the object identifier, the source of the representation included in the object identifier and any parent object identifier from which information was obtained. Additional description about the object identifiers is provided below with respect to FIG. 2.

The set data store 116 includes information about each set established by users of the object management service 110. As discussed above, a set is a collection of object identifiers that a user creates. A set may be a null set that does not include any object identifiers. Likewise, any number of object identifiers may be associated with a set. The set data store 116 for each set stores information that identifies the user that created the set, the context for the set, a category for the set, any user provided annotations for the set, any static information associated with the set and an identification of object identifiers associated with the set. Additional description about sets is provided below with respect to FIG. 2.

The source data store 118 stores information about sources of objects that are represented by object identifiers managed by the object management service 110 and/or information about external sources that provide supplemental information associated with representations of one or more objects. In some examples, the source may be a website from which an image was obtained to create an object identifier. In other examples, the source may be a physical location. In still other examples, a source may be any external entity that provides supplemental information, such as annotations, that is associated with representations of objects. For example, an external source may be a weather service that provides current weather information that is periodically updated and provided to users when viewing object identifiers for objects at specific locations.

The source data store 118 may include any form of information about each source including, but not limited to, the name of the source, whether the source has been verified by the object management service 110, the type of information provided by the source, identification of representations associated with the source, and the like.

The user profiles data store 120 stores information about users 101 of the object management service 110. Any type of information may be stored in the user profile data store 120. For example, user profile information, such as attributes, name, address, gender, browse history, object identifier history, set history, annotation or unit group history, social networks and/or friends with which the user 101 interacts, and the like may be stored in the user profiles data store 120. User profile information may be provided directly by users 102 and/or collected from users 102 of the client devices 104 when interacting with the object management service 110 (e.g., clickstream data as the user explores the object management service 110), when viewing, creating or interacting with sets, when viewing, creating or interacting with object identifiers, and/or when sharing information with friends or social communities through the object management service 110. In some implementations, user information may be obtained from external sources. For example, user profile information may be obtained from a third party with which the user is also affiliated (e.g., e-commerce web site, social network) and has agreed to allow sharing of some or all user profile information provided to that third party and/or collected by that third party. In some implementations, users of the object management service 110 may choose to limit the amount of information included in their user profile, to limit access to their user profile information and/or to limit what information is shared, if any, from their user profile information.

The user profile information maintained in the user profile data store 120 may be used by the object management service 110 in determining contexts for sets of objects created by the user, determining contexts for object identifiers created by the user and/or in identifying object identifiers that may be of interest to the user. Likewise, user profile information may be used to determine interest trends for a user and/or the user's current interest. For example, based on a user's past trends and provided annotations, the object management service 110 may determine that the user has three main interests, dirt bikes, dogs, and hiking. Depending on the unit groups used by the user when creating object identifiers, the object management service 110 can determine the likely current interest of the user and/or the context of the object identifier, as understood by the user.

In addition to maintaining information about mappings, object identifiers, sets, sources, and users, the object management service 110 may provide use information back to the users 101 and/or the external sources 106. For example, the object management service 110, through communication between the server system 102 and a client device 104, may provide use information back to a user 101. Such information may include an identification of object identifiers recently viewed, created or added, identification of others that have viewed the user's sets, object identifiers, and the like. Likewise, the object management service 110, through communication between the server system 102 and the external sources 106, may provide information to the external sources 106. Such information may include analytics about representations of objects associated with the external source 106, other external sources that may be associated with and provide supplemental information for an object with which the external source is associated, and the like.

Figure 2:
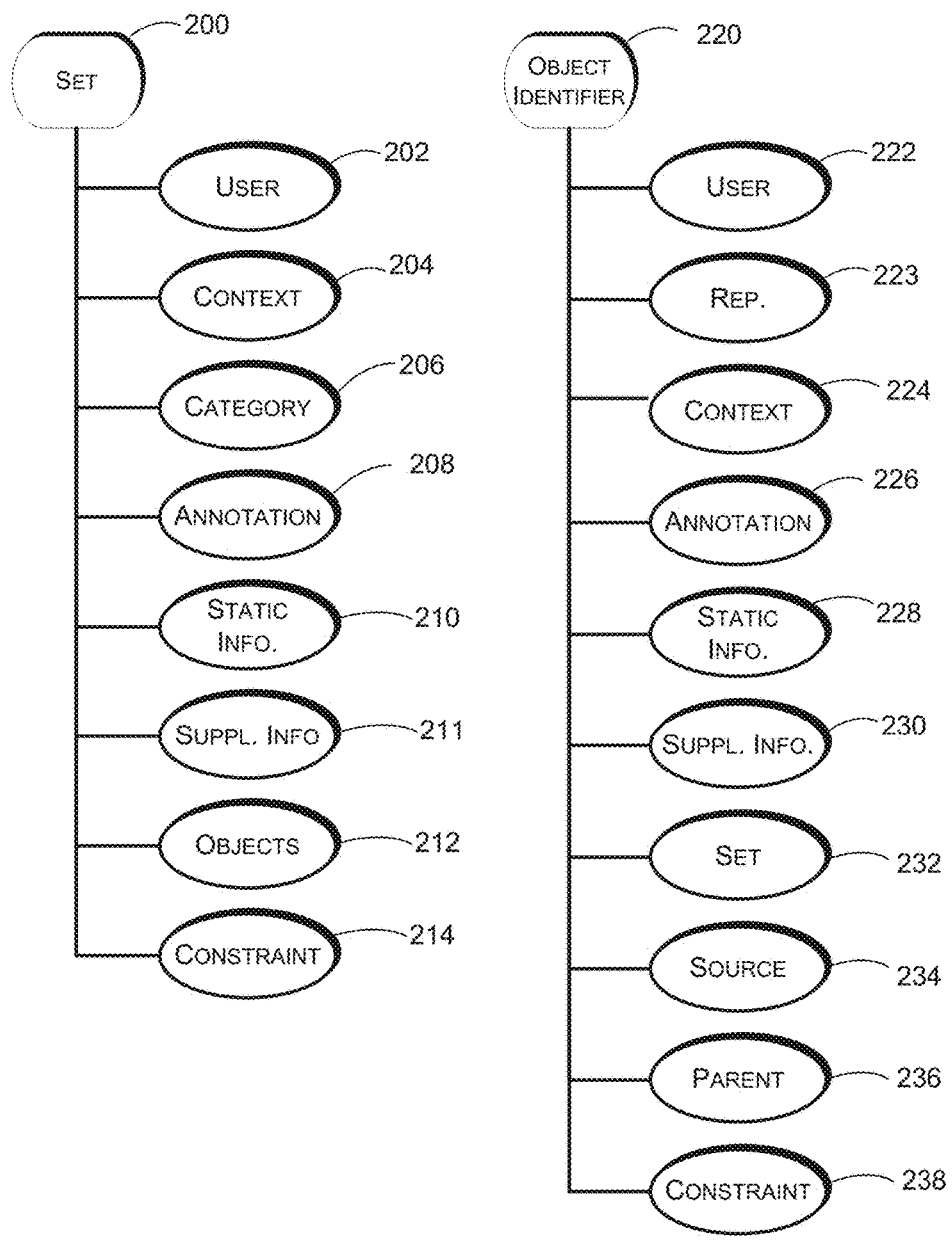
FIG. 2 is a block diagram of an example structure of a set and an object identifier, according to an implementation.

FIG. 2 is a block diagram of an example structure of a set 200 and an object identifier 220, according to an implementation. As discussed above, a set 200 may include an identification of the user 202 that created the set and any users that have been identified as allowed to add object identifiers to the set. In addition, a context 204 as provided by a user or determined by the object management service 110, may be associated with the set 200 along with a user selected category 206. A category 206 may be selected from a list of preexisting categories provided by the object management service 110. For example, a category 206 may be animals, books, arts and entertainment, sports, food and drink, etc. and a user, upon creating a set 200, may select one or more of those categories for association with the set 200. A user may also provide annotations 208 providing information about the set 200 from the user's perspective. Static information 210 may also be associated with the set 200. For example, the object management service 110 may automatically incorporate certain information relevant to a set 200 based on the selected category and optionally the provided annotation 208. Static information 210 may also include information provided by the creator of the set and/or other users of the object management service 110. For example, other users may view, comment, annotate and/or otherwise provide feedback with respect to a set. Annotations, comments and/or other feedback from the creator and/or other users may be associated with the set 200 and maintained as static information 210.

Supplemental information 211 relevant to the set 200 may also be maintained. Supplemental information for a set may be any form of information or action provided by a source of one or more representations associated with the set, a source of one or more objects associated with a set, or any other external source. For example, if the set is about Hawaii, a weather service (external source) may provide supplemental information in the form of weather in Hawaii that is associated with the set. As object identifiers are added to the set 200 they may be identified as objects 212 associated with the set 200.

Finally, constraints 214 may also be associated with the set 200 and used to control access, modification or other aspects of the set 200. For example, the creator of a set 200 may specify constraints as to who can view the set, add object identifiers to the set, whether users can comment on the set, etc.

In some implementations, an object identifier 220 may include an identification of the user 222 that created the object identifier 220, a user provided annotation 226 describing the object identifier from the user's perspective, and static information 228. Similar to the set 200, the static information 228 may be included in the object identifier 220 by the object management service 110 based on the selected representation 223 of the object and/or the annotation provided by the user. For example, if a user has selected a representation 223 of the object that is already known to the object management service, existing information about the representation may be included in the object identifier 220. Other static information about an object identifier 220 may include comments and/or annotations provided by other users of the object management service 110, the creator of the object identifier, etc.

A representation 223 may also be included in the object identifier. The representation may be any element that can be used to represent the object. For example, the representation may be a graphical representation of the object, an audio representation of an object, or any other representation of an object.

In addition to the object management service 110 providing static information 228, in some implementations, supplemental information 230 may also be associated with the object identifier 220. Supplemental information may be any form of information or action provided by a source of the representation, a source of the object, or any other external source. For example, the source of the object may provide information about the object while other external sources may provide actions relevant to the object. For example, if the object is a television, the source of the television may be the manufacturer, such as Sony, and that source may provide basic information about the object. In this example, the information about the object provided by the manufacturer may include the dimensions, resolution, weight, etc. Other external sources, such as sellers of the television, may provide additional supplemental information that may be associated with the object identifier 220. For example, sellers of the object may provide actions that allow a user viewing the object identifier 220 to initiate a purchase of the object, obtain additional information about the object, obtain information about the external source selling the object, etc.

Returning to FIG. 2, the object identifier 220 may also identify a source 234 from which the representation of the object was obtained, or the source of the object. In addition to providing a source 234, if the object identifier was based upon and created from another existing object identifier, that existing object identifier may be identified in the object identifier 220 as the parent 236 of the object identifier 220. Finally, constraints 238 may also be associated with the object identifier 220 and used to control access, modification or other aspects of the object identifier 220. For example, the creator of an object identifier 220 may specify constraints as to whether the object identifier can be viewed by other users, copied into other sets, whether users can add annotations to the object identifier, etc.

Figure 3:
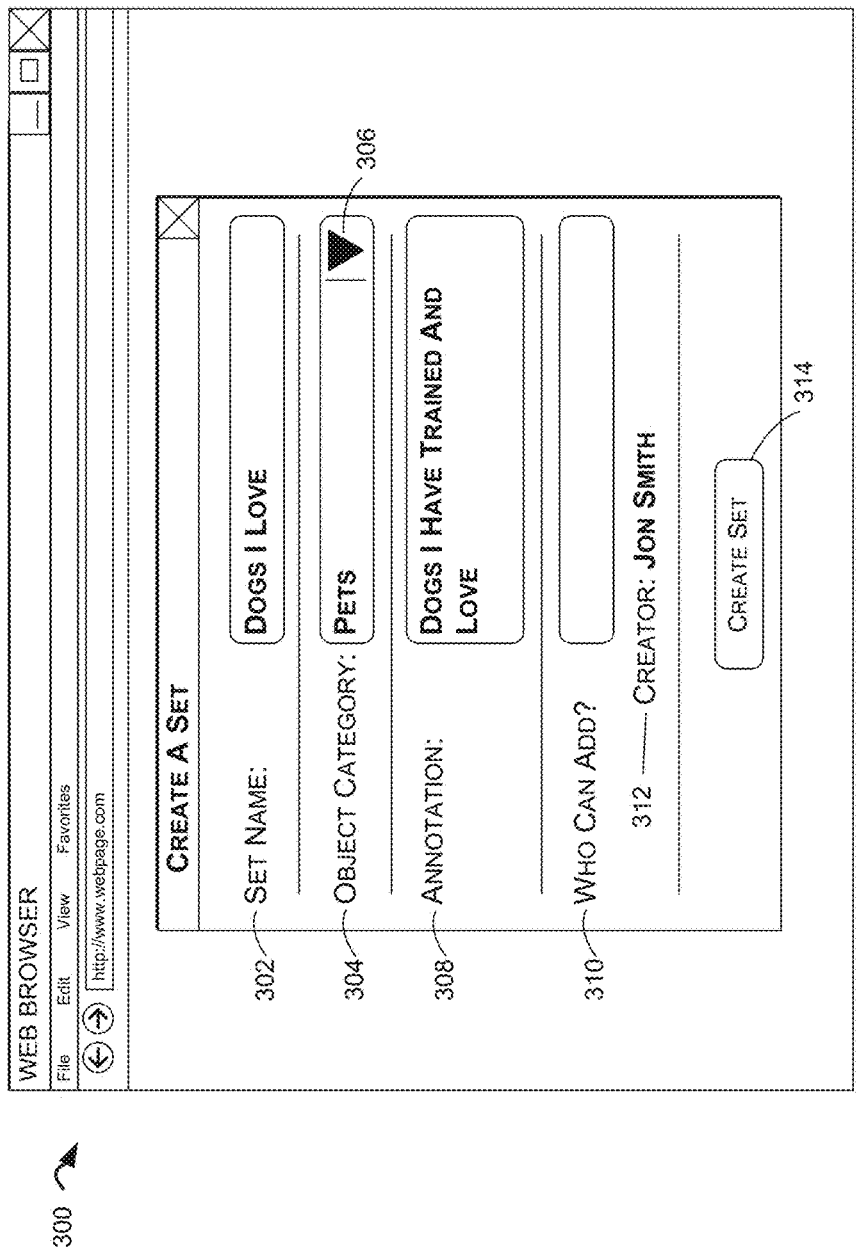
FIG. 3 is a block diagram of an example user interface for creating a set, according to an implementation.

FIG. 3 is a block diagram of an example user interface 300 for creating a set, according to an implementation. As illustrated in the example user interface 300 a user interacting with the object management service 110 may submit a request to create a set and be provided with the user interface 300. Through the user interface 300, a user may specify a name 302 for the set, such as "Dogs I Love." As used herein, a set name may also be considered an annotation. In addition to providing a name 302 for the set, a user may select one or more object categories 304 by interacting with the category list control 306 that provides a list of the different categories that may be associated with a set. In this example, the creator 312, Jon Smith, has selected the object category 304 of Pets because the set is being created about dogs, as identified by the set name 302.

In addition to specifying a category, a user may provide an annotation 308 about the purpose and/or other information about the set from the perspective of the user creating the set. In some implementations, the annotation 308 may provide information to the user or other individuals viewing the set or object identifiers within the set. The annotation 308 may also be used by the object management service 110 as a factor for determining a context for the set. Likewise, as discussed in more detail below, the annotations may be used to generate unit groups, to establish relationships between items (e.g., representations, object identifiers, sets, users) and/or to organize the presentation of items.

The user 312 may also be able to specify whether any other users can add object identifiers to the set by including an identification of those users in the Who Can Add control 310. For example, if other users of the object management service 110 are to have the ability to add object identifiers to the created set, the creator 312 of the set may identify those users by their user name, e-mail address, or other identifier and the object management service 110 may associate those users with the set and invite those users to access the set. Finally, once a user has specified all the information for the set, the user may provide a request to the object management service 110 to create the set through selection of the create set control 314.

Figure 4:
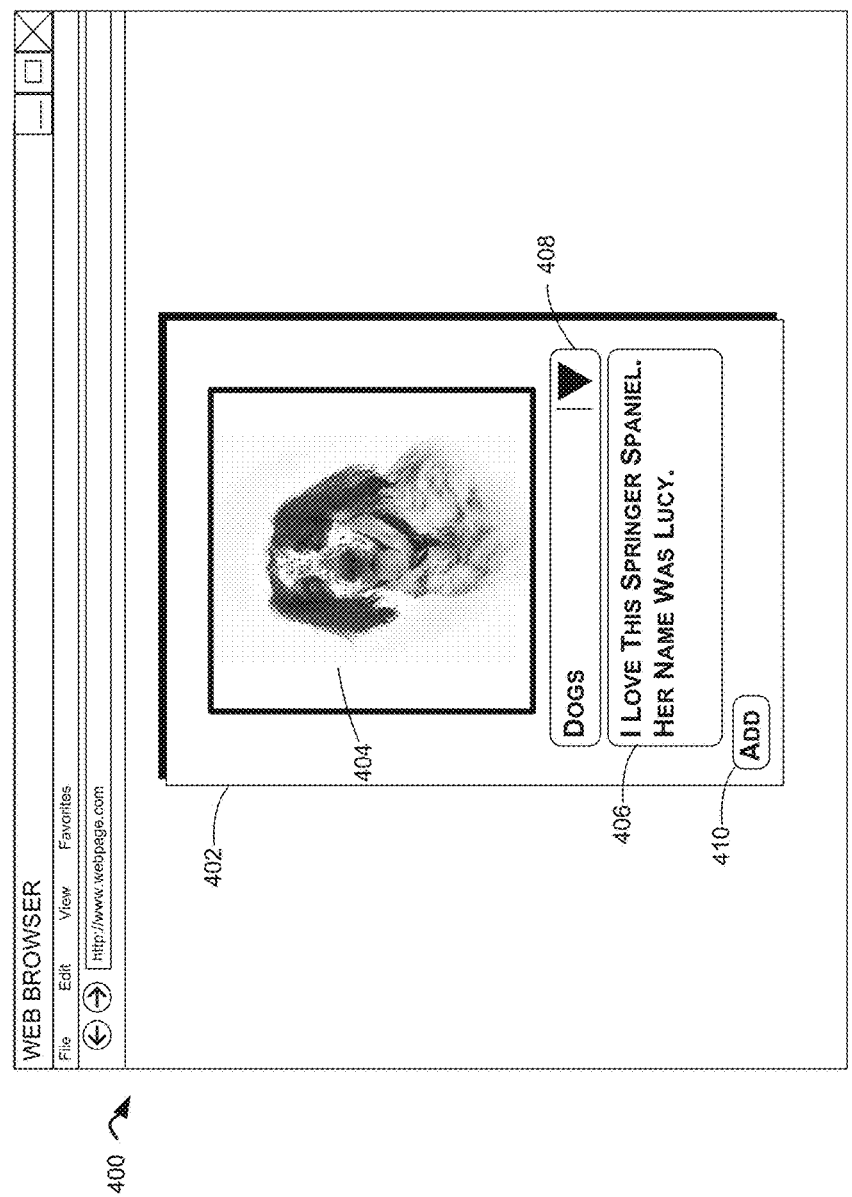
FIG. 4 is a block diagram of an example user interface for creating an object identifier, according to an implementation.

FIG. 4 is a block diagram of an example user interface for creating an object identifier, according to an implementation. If the user is creating a new object identifier 402 from an existing object identifier, the new object identifier 402 may assume or inherit some of the information associated with the existing object identifier. The user may also modify other information. If the object identifier 402 is being created without utilizing another existing object identifier, the user is provided with the user interface 400 and may provide information for creating the object identifier 402.

For example, the user may provide a representation 404, annotations 406 and/or select a set with which the object identifier is to be associated by selecting the set control 408. For example, the user may provide a representation 404 of their dog and include the annotation "I Love My Cocker Spaniel. Her Name Was Lucy" 408. Once the user has selected a set and provided representations and/or annotations for the new object identifier 402 based on their own context, they may complete the addition of that new object identifier 402 to the identified set through selection of the add control 410. Upon selecting the add control 410, the new object identifier 402 is associated with the selected set, a parent relationship is created and maintained if the object identifier originated from an existing object identifier, and the other information described herein is associated and maintained with the new object identifier 402, set and/or user. As discussed further below, the annotations provided by the user for the object identifier 402 may be processed to identify unit groups and relationships between the object identifier and other items may be established based on those unit groups.

Figure 5:
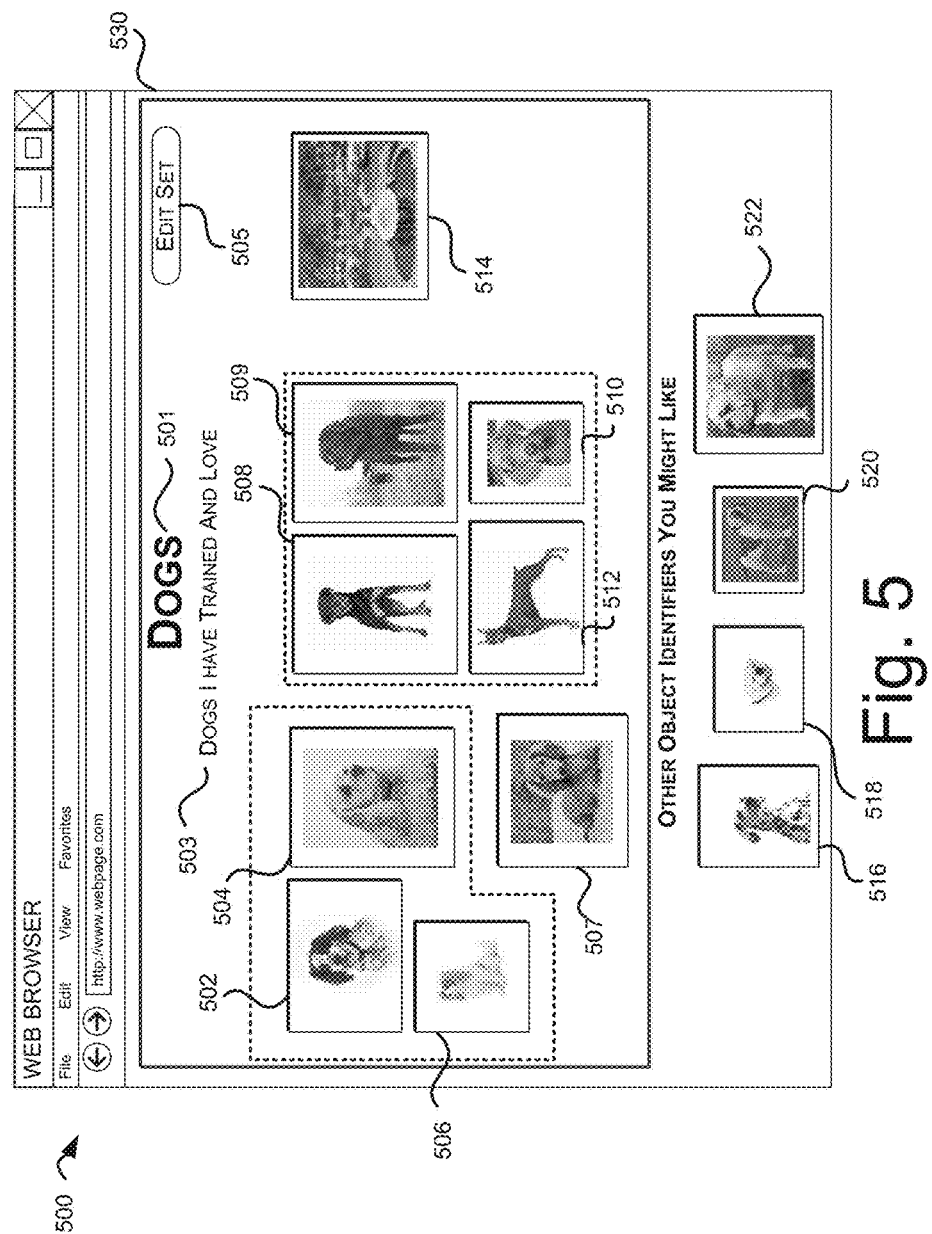
FIG. 5 is a block diagram of an example user interface for a set including multiple object identifiers, according to an implementation.

FIG. 5 is a block diagram of an example user interface 500 identifying a set 530 that includes multiple object identifiers, according to an implementation. The user interface 500 illustrated in FIG. 5 includes the name 501 of the set 530 provided by the user when creating the set along with the annotation 503 for the set. A user may modify the set by selecting the edit control 505.

In this example, the user has associated nine object identifiers 502, 504, 506, 507, 508, 509, 510, 512, 514 with the set. As described herein, each object identifier may include a representation of the object, an annotation of the object provided by the user or another external source, and a source of the object and/or a source of the representation of the object. Likewise, based on the unit group(s) identified in each object identifier, the object identifiers within the set may be arranged according to those unit groups. In this example, the object identifiers 502, 504, 506, which include representations and annotations related to Spaniels, have been grouped together because there is a relationship based on the unit groups included in the annotation of each. In this example, the corpus was the set 530 and the unit group "spaniel" was identified and used to relate those three object identifiers.

Likewise, the object identifiers 508, 509, 510, 512 have been grouped together because they all included the unit group "big dog" in the annotation of the object identifiers. The object identifier 507 was not grouped with any of the other object identifiers because it did not have any corresponding unit groups. However, because it did include a unit group "Dachshund" that relates to the other identified unit groups (e.g., they are all dogs), it may be positioned and presented near those other object identifiers. In comparison, the object identifier 514, which includes the annotation "Hotel for my next vacation" was not related to or positioned with any of the other object identifiers as there is no identified relationship.

Presenting object identifiers based on relationships identified through analysis of the annotations, discussed further below, provides a user with an organized view of their sets based on the context of the object identifiers as understood by the user. Likewise, it may also help identify unwanted object identifiers and/or sets that may have been created for malicious intent (e.g., spam).

In addition to arranging object identifiers within a set 530 based on the identified unit groups, in some implementations, other items may also be presented to a user while viewing the set 530. For example, other object identifiers 516, 518, 520, 522 that include unit groups corresponding with those of the object identifiers included in the set 530 may be presented as potentially interesting to the user. In other implementations, other related sets may be presented. In still other examples, users with similar interests may be identified based on common unit groups used by those users when annotating items. Such users may be presented or otherwise identified on the user interface 500.

Sets may be displayed in a variety of other manners as well. For example, sets may be arranged based on the context of the user viewing the set, the category and/or context of the set, the object identifiers associated with the set, the capabilities of the client device upon which the set will be displayed, etc. Regardless of how the object identifiers of the set are presented and/or how other items may be presented, a user can interact with the set to view the various object identifiers and/or other items. It will be appreciated that object identifiers of a set can be organized and presented in a multitude of different ways and the ones presented herein are provided only as examples. Likewise, object identifiers may also be organized in presented in a variety of ways independent of sets. Still further, sets may likewise be organized and presented in a multitude of different ways for viewing by users.

Figure 6:
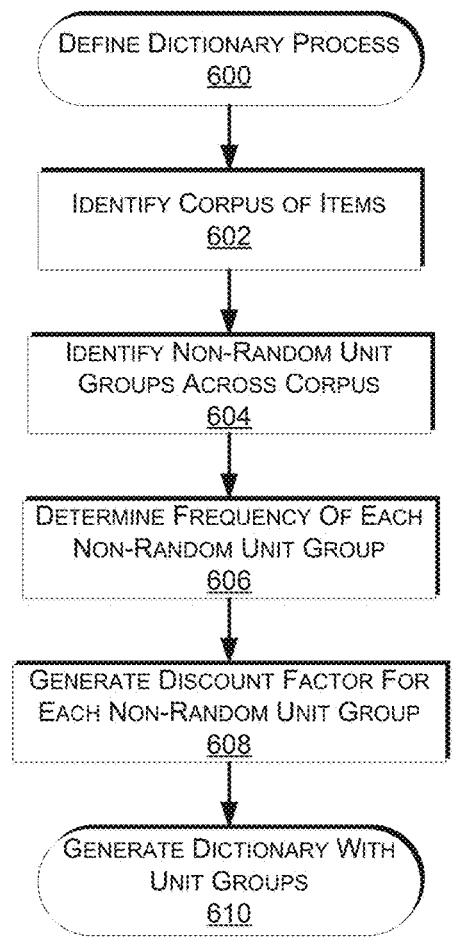
FIG. 6 illustrates an example process for defining a dictionary, according to an implementation.

FIG. 6 illustrates an example process 600 for developing a unit group dictionary, according to an implementation. The example process 600 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation and any number of the described operations can be combined in any order and/or in parallel to implement the process. Likewise, additional or fewer operations than those described may be utilized with the various implementations described herein.

The example process 600 begins by identifying a corpus of items, such as representations, object identifiers and/or sets that include one or more annotations, as in 602. The annotations may be provided by users and/or external sources. For example, the corpus may include all representations managed by the object management service 110, and the example process 600 may consider annotations associated with those representations. In another example, the corpus may include all object identifiers and all representations managed by the object management service 110 and the process 600 may consider annotations associated with those object identifiers and/or representations. In still other implementations, the corpus may include only object identifiers that are part of a set and the process 600 may consider the annotations associated with those object identifiers. As still another example, the corpus may include only object identifiers that utilize the same representation. As will be appreciated, the corpus of items may be any number and combination of items that may include one or more annotations.

Utilizing the corpus of items, the example process 600 identifies non-random unit groups included in the annotations of the corpus, as in 604. In some implementations, the joint probability of the units appearing together may be compared to the probability of the units appearing separately. If the joint probability of the units appearing together is higher than the probability of the units appearing separately, the group of units is identified as a non-random unit group. A non-random unit group may be any combination of items.

To illustrate, when processing the annotations of the corpus, the units "Cocker" and "Spaniel" may be identified. It may be determined that the joint probability of the two units "Cocker Spaniel" appearing together is higher than the probability of the units "Cocker" and "Spaniel" appearing independently. In some implementations the joint probability of the two units appearing together and the probability of the units appearing separately may be determined based on the frequency with which the units appear in the corpus. In some implementations, pointwise mutual information, or pointwise mutual probability, may be computed to determine how informative the occurrence of one unit is about the occurrence of another unit. For example, it may be determined that the information about Cocker is increased if followed by the unit Spaniel. In such an instance, there is a higher probability that these units will appear together.

Based on this information, the example process 600 may identify the units "Cocker Spaniel" as a non-random unit group. As another example, the units "Happy" and "Birthday" may also be identified. However, it may be determined that the joint probability of the units "Happy Birthday" is not higher than the probability of the units "Happy" and "Birthday" appearing separately. As such, the unit group "Happy Birthday" may not be identified as a non-random unit group. As will be appreciated, depending on the annotations in the corpus being processed, the identified non-random unit groups may vary.

For each identified non-random unit group, the example process 600 may determine the frequency with which each non-random unit group appears in the corpus, as in 606. Based on the determined frequency, a discount factor may be established for each identified non-random unit group, as in 608. An example for establishing a discount factor is discussed below with respect to FIG. 7.

Based on the identified non-random units and the corresponding discount factors, a unit group dictionary may be established for the corpus, as in 610. In some implementations, all identified non-random unit groups may be included in the dictionary along with their corresponding discount factors. In other implementations, a threshold may be established and only non-random unit groups with a discount factor above the threshold are included in the dictionary. Non-random unit groups with high discount factors may be removed because they appear too frequently in the corpus to provide discriminating results. For example, even though the units "keep" and "trying" have a joint probability that is higher than the probability of those units appearing separately, because the unit group appears in a high number of annotations associated with items, the non-random unit group does not provide useful information. In other implementations, abusive unit groups (e.g., foul language) may also be identified and removed. For example, some unit groups may be pre-identified as abusive. When these unit groups are identified they may automatically be removed as not providing useful information. In some implementations, the actual unit groups may be removed from the object identifiers and/or sets. In still other implementations, the object identifiers and/or sets that include abusive unit groups may be identified and removed.

Figure 7:
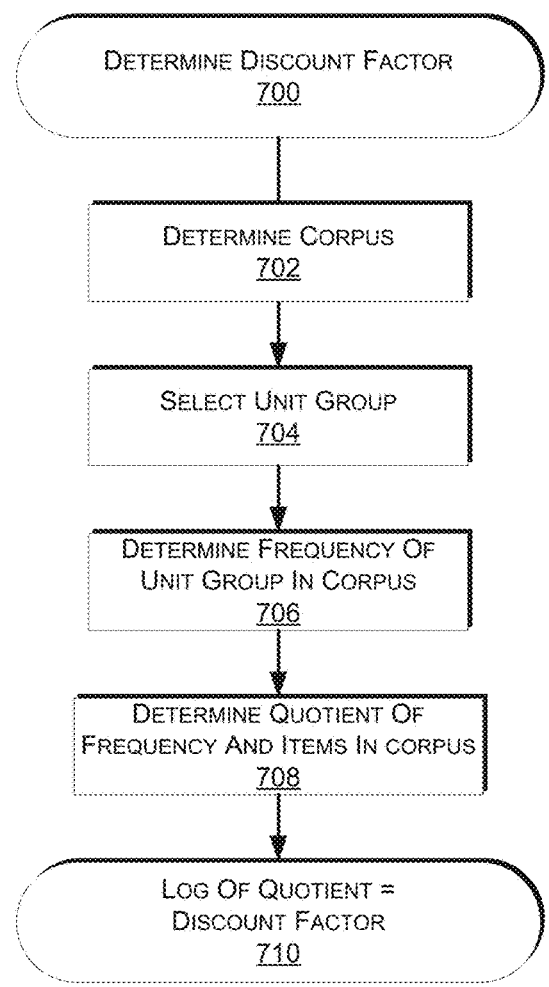
FIG. 7 illustrates an example process for determining a discount factor, according to an implementation.

FIG. 7 illustrates an example process 700 for determining a discount factor, according to an implementation. The example process 700 initiates by determining a corpus of items (e.g., representations, object identifiers, and/or sets), as in 702. As discussed above, a discount factor may be determined for each identified non-random unit group based on a corpus of items. In some implementations, this may be the entire corpus of items managed by the object management service 110. For example, a discount factor may be determined for each non-random unit group identified as part of the example process 600 (FIG. 6) and the discount factor may be used to determine whether to include the non-random unit group in a dictionary. In other implementations, the corpus may be a subset of items, such as object identifiers in a set, or sets associated with a user.

Based on the corpus of items, a unit group from the corpus is selected for review, as in 704. The unit group may be any unit group included in the dictionary that also appears in the corpus of items selected in block 702. For the selected unit group, a frequency with which the unit group appears in the corpus is determined, as in 706. Based on the frequency, a quotient (X) is determined as follows:

$$\frac{\text{Frequency Of Unit Group In Corpus}}{\text{Number Of Items In Corpus}} = X$$

Finally, the log of the quotient (X) may be computed and utilized as the discount factor for the selected unit group, as in 710:

$$\log(X) = \text{discount factor}$$

Figure 8:
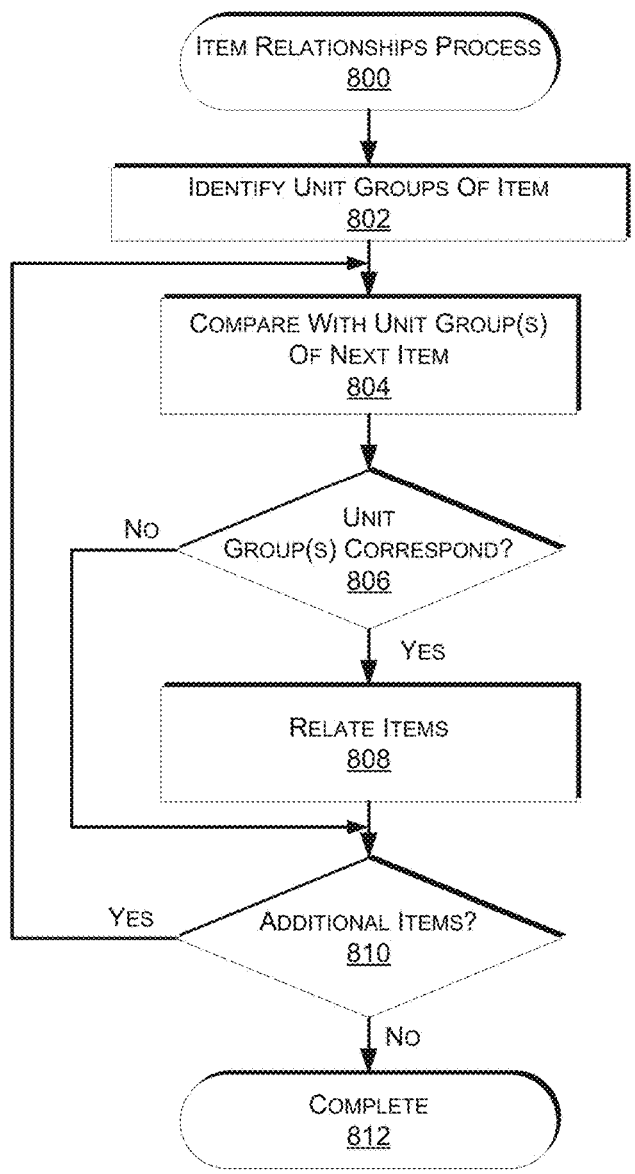
FIG. 8 illustrates an example process for establishing item relationships, according to an implementation.

FIG. 8 illustrates an example process 800 for establishing item relationships, according to an implementation. Relationships may be established between the same and/or different types of items. Likewise, each item may have multiple relationships. For example, a relationship may be established between multiple representations, between a representation and object identifiers, between object identifiers and users, between multiple users and/or any combination thereof. To further illustrate, an object identifier that includes the unit group "Cocker Spaniel" may be related to other object identifiers that include the same unit group (Cocker Spaniel) in the annotations. Utilizing relationships, information can be provided to users as they interact with the object management service 110. For example, when a user is viewing object identifiers that include images of a Cocker Spaniel, the object management service 110 may identify other related object identifiers that include a unit group "Cocker Spaniel" and present those object identifiers to the user.

For a selected item, the unit group(s) associated with the item is identified, as in 802. The identified unit group(s) is then compared with the annotations of a next item in the corpus, as in 804. Based on the comparison, a determination is made as to whether there are one or more corresponding unit groups between the items, as in 806.

If it is determined that there is one or more corresponding unit groups, the items are related, as in 808. In some implementations, as long as there is one match of unit groups between items, a relationship may be established. In other implementations, multiple matching unit groups may be required before a relationship is established. In still other implementations, a relationship may have a strength indicator identifying how strong the relationship between items is. For example, items with multiple corresponding unit groups may have a strong relationship, wherein items with only one corresponding unit group may have a weaker relationship.

If it is determined that there is no common unit group, or after establishing a relationship between the items, a determination is made as to whether there are additional items in the corpus to compare with the unit group(s) of the item under review, as in 810. If it is determined that there are additional items to consider, the example process 800 returns to block 804 and continues. However, if there are no additional items in the corpus to compare with the unit group(s) of the item under review, the example process completes, as in 812.

Figure 9:
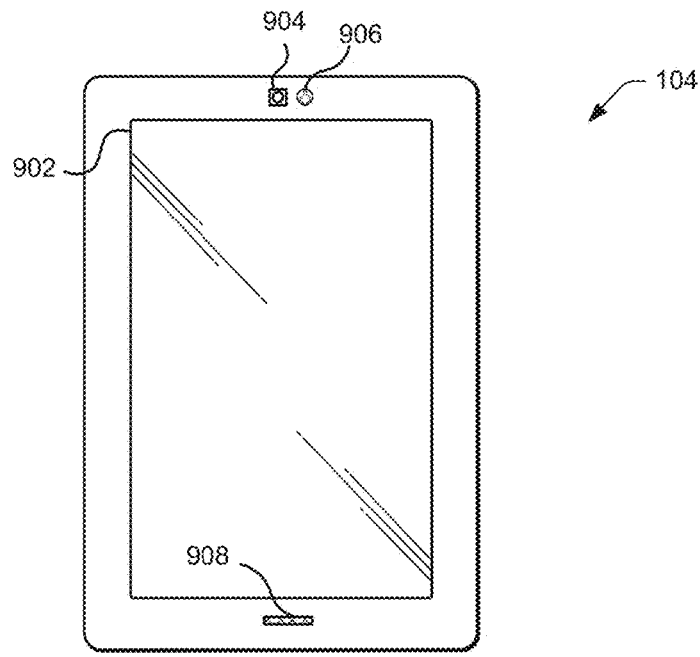
FIG. 9 illustrates an example computing device that can be used in accordance with various implementations.

FIG. 9 illustrates an example client device 104 that can be used in accordance with various implementations described herein. In this example, the client device 104 includes a display 902 and optionally at least one input component 904, such as a camera, on a same side of the device as the display 902. The client device 104 may also include an audio transducer, such as a speaker 906, and optionally a microphone 908. Generally, the client device 104 may have any form or input/output components that allow a user to interact with the client device 104. For example, the various input components for enabling user interaction with the device may include a touch-based display 902 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 10:
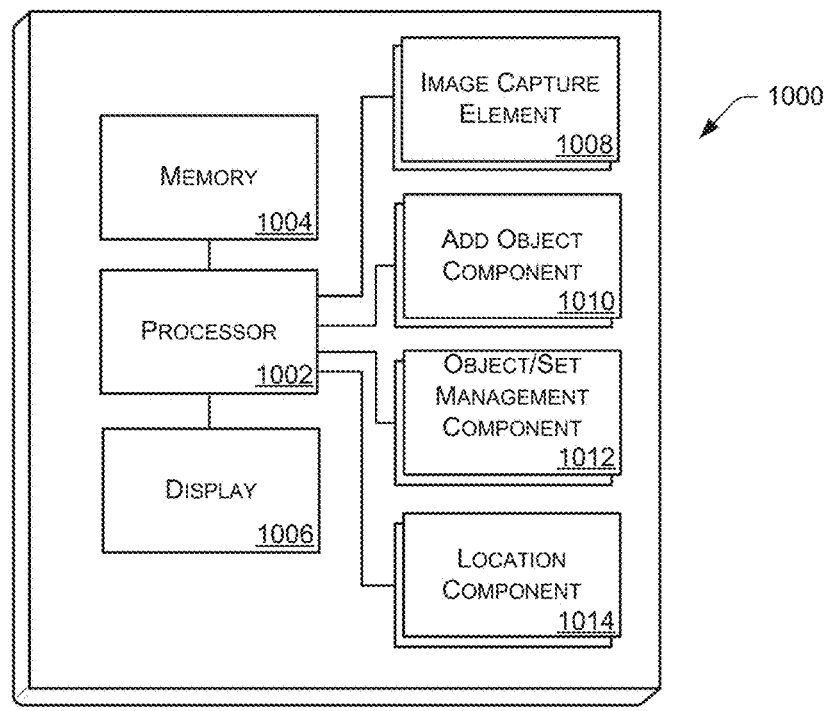
FIG. 10 illustrates an example configuration of components of a computing device, such as that illustrated in FIG. 9.

In order to provide the various functionality described herein, FIG. 10 illustrates an example set of basic components 1000 of a client device 104, such as the client device 104 described with respect to FIG. 9 and discussed herein. In this example, the device includes at least one central processor 1002 for executing instructions that can be stored in at least one memory device or element 1004. As would be apparent to one of ordinary skill in the art, the device can include many types of memory, data storage or computer-readable storage media, such as a first data storage for program instruction for execution by the processor 1002. Removable storage memory can be available for sharing information with other devices, etc. The device typically will include some type of display 1006, such as a touch-based display, electronic ink (e-ink), organic light emitting diode (OLED) or liquid crystal display (LCD).

As discussed, the device in many implementations will include at least one image capture element 1008, such as one or more cameras that are able to image objects in the vicinity of the device. An image capture element can include, or be based at least in part upon any appropriate technology, such as a CCD or CMOS image capture element having a determined resolution, focal range, viewable area, and capture rate. The device can include at least one add object component 1010 for performing the process of creating an object identifier that identifies an object, and/or interacting with the object management service 110 as part of the process of creating an object identifier that identifies an object. For example, the client device may be in constant or intermittent communication with the object management service 110 and may exchange information, such as representations, annotations, source information, etc. with the object management service 110 as part of the process for creating an object identifier for an object.

The device may also include an object/set management component 1012 that stores and manages information about existing object identifiers, sets created by or otherwise associated with the user of the client device and/or relationships between items. Storing and maintaining such information on the device provides the ability for a user to interact with and use many of the various implementations discussed herein even in the event the client device cannot communicate with the object management service 110.

The device also can include at least one location element 1012, such as GPS, NFC location tracking or Wi-Fi location monitoring. Location information obtained by the location element 1012 may be used with the various implementations discussed herein to identify the location of the user, source location, object location, and the like and support the creation, modification and/or management of sets and/or object identifiers.

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 11:
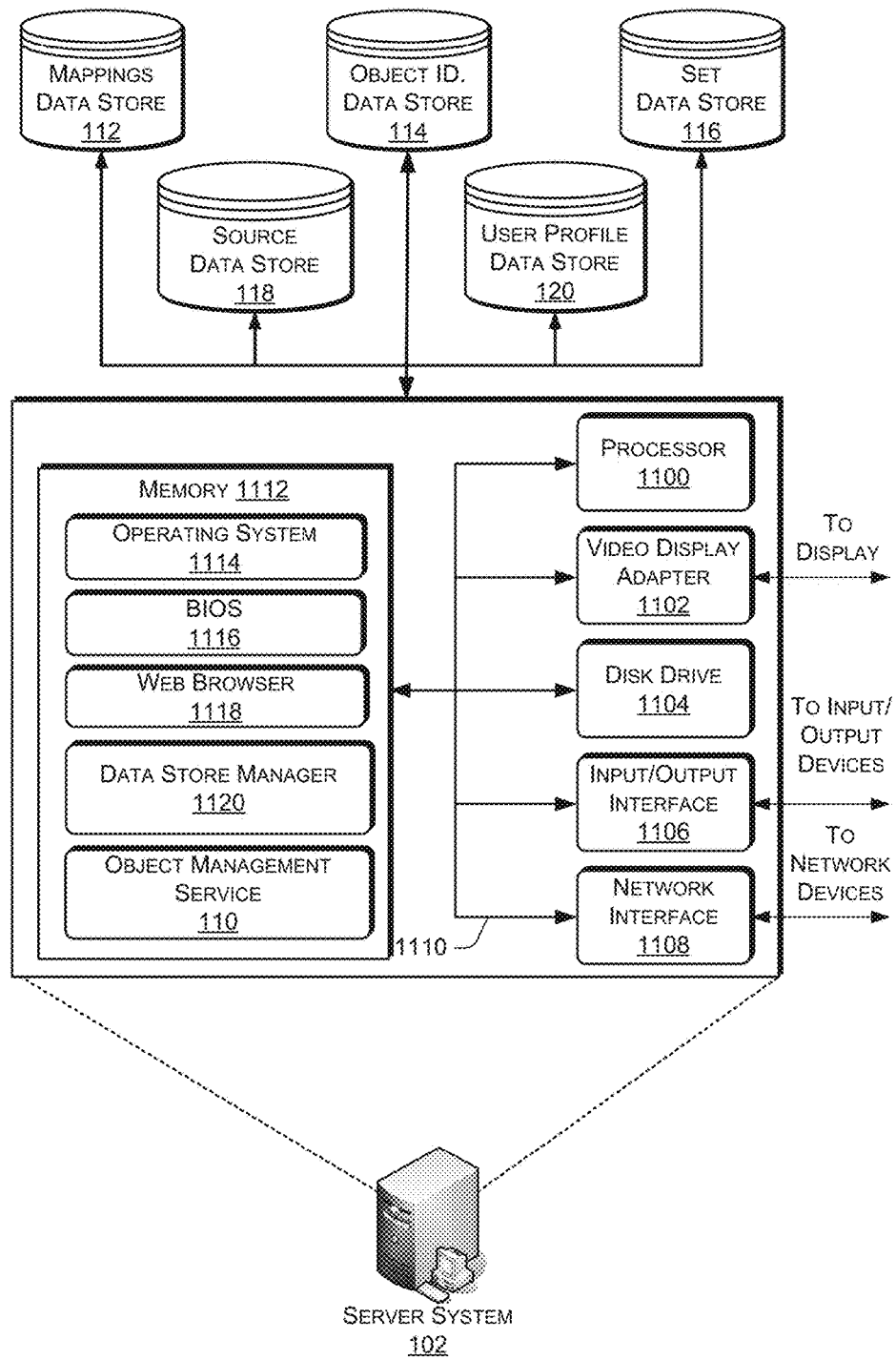
FIG. 11 is a pictorial diagram of an illustrative implementation of a server system that may be used for various implementations.

FIG. 11 is a pictorial diagram of an illustrative implementation of a server system, such as the server system 102, that may be used in the environment of FIG. 1. The server system 102 may include a processor 1100, such as one or more redundant processors, a video display adapter 1102, a disk drive 1104, an input/output interface 1106, a network interface 1108, and a memory 1112. The processor 1100, the video display adapter 1102, the disk drive 1104, the input/output interface 1106, the network interface 1108, and the memory 1112 may be communicatively coupled to each other by a communication bus 1110.

The video display adapter 1102 provides display signals to a local display (not shown in FIG. 11) permitting an operator of the server system 102 to monitor and configure operation of the server system 102. The input/output interface 1106 likewise communicates with external input/output devices not shown in FIG. 11, such as a mouse, keyboard, scanner, or other input and output devices that can be operated by an operator of the server system 102. The network interface 1108 includes hardware, software, or any combination thereof, to communicate with other computing devices. For example, the network interface 1108 may be configured to provide communications between the server system 102 and other computing devices, such as the client device 104, via the network 108, as shown in FIG. 1.

The memory 1112 generally comprises random access memory (RAM), read-only memory (ROM), flash memory, and/or other volatile or permanent memory. The memory 1112 is shown storing an operating system 1114 for controlling the operation of the server system 102. A binary input/output system (BIOS) 1116 for controlling the low-level operation of the server system 102 is also stored in the memory 1112.

The memory 1112 additionally stores program code and data for providing network services that allow client devices 104 and external sources 106 to exchange information and data files with the server system 102 and/or the object management service 110. Accordingly, the memory 1112 may store a browser application 1118. The browser application 1118 comprises computer executable instructions that, when executed by the processor 1100, generate or otherwise obtain configurable markup documents such as Web pages. The browser application 1118 communicates with a data store manager application 1120 to facilitate data exchange and mapping between the mappings data store 112, the object identifier data store 114, the set data store 116, the source data store 118 and/or the user profile data store 120, client devices, such as the client device 104 shown in FIG. 1 and/or external sources, such as the external sources 106 shown in FIG. 1.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the data stores 112-120 as needed to execute aspects of one or more applications for the client device 104, the external sources 106 and/or the object management service 110. The server system 102 provides access control services in cooperation with the data stores 112-120 and is able to generate content such as text, graphics, audio, video and/or object identifier or set related information (e.g., representations, context, annotations, mappings, analytics about user interfaces) to be transferred to the client device 104 or external sources 106.

The data stores 112-120 can include several separate data tables, databases or other data storage mechanisms and media for storing data relating to a particular aspect. For example, the data stores 112-120 illustrated include mechanisms for storing content, user information, mappings and external source information, representations, which can be used to generate and deliver content to client devices 104 and/or external sources 106 (e.g., sets, object identifiers, representations) and control actions to be performed.

It should be understood that there can be many other aspects that may be stored in the data stores 112-120, such as access rights information, which can be stored in any of the above listed mechanisms as appropriate or in additional mechanisms of any of the data stores 112-120. The data stores 112-120 are operable, through logic associated therewith, to receive instructions from the server system 102 and obtain, update or otherwise process data in response thereto. In one example, an external source might submit a request to associate supplemental information with a representation of an object. In this case, the source data store 118 might access the source's profile information to verify the source and whether the source is associated with the representation. The information can then be returned to the user, such as in a user interface delivered to a client device 104 that the user is able to view.

The memory 1112 may also include the object management service 110, discussed above. The object management service 110 may be executable by the processor 1100 to implement one or more of the functions of the server system 102. In one implementation, the object management service 110 may represent instructions embodied in one or more software programs stored in the memory 1112. In another implementation, the object management service 110 can represent hardware, software instructions, or a combination thereof.

The server system 102, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    under control of one or more computing systems configured with executable instructions,
        identifying a corpus of items, wherein a plurality of the corpus of items include annotations;
        processing the annotations to determine a plurality of unit groups;
        determining a plurality of non-random unit groups from the plurality of unit groups at least in part by determining that a joint probability that a plurality of units of the plurality of unit groups are more likely to appear together in the corpus of items is greater than a probability of the plurality of units appearing separately in the corpus of items;
        for each of the plurality of non-random unit groups, determining a discount factor based at least in part on a number of times the non-random unit group appears in the corpus of items; and
        generating a unit group dictionary that includes non-random unit groups with a discount factor above a defined threshold.

2. The computer-implemented method of claim 1, wherein each of the plurality of non-random unit groups includes at least two units.

3. The computer-implemented method of claim 1, wherein each item of the corpus of items include at least one of a representation, an object identifier, a set, or a user.

4. The computer-implemented method of claim 1, wherein the units of at least one non-random unit group of the plurality of non-random unit groups e include at least one of a character, a word, a symbol, or a number.

5. The computer-implemented method of claim 1, wherein at least one of the non-random unit groups includes at least two units included in the annotations.

6. The computer-implemented method of claim 1, wherein the joint probability is determined based at least in part on a number of times the units of the plurality of unit groups appear together in the corpus of items.

7. The computer-implemented method of claim 1, wherein the probability is determined based at least in part on a number of times the units of the plurality of unit groups appear independently in the corpus of items.

8. The computer-implemented method of claim 1, wherein determining a discount factor further includes determining a quotient of the number of times the non-random unit groups appear in the corpus of items and a number of item in the corpus of items.

9. The computer-implemented method of claim 1, wherein a unit is any form of a character, a symbol, a number, or other identifier.

10. A non-transitory computer-readable storage medium storing instructions that, when executed by one or more processors, cause the one or more processors to at least:

identify a corpus of items, wherein a plurality of the corpus of items include annotations;

determine a plurality of non-random unit groups at least in part by determining that a joint probability that a plurality of units of a unit group are more likely to appear together in the corpus of items is greater than a probability of the plurality of units of the unit group appearing separately in the corpus of items;

for each of the plurality of non-random unit groups, determine a discount factor based at least in part on a number of times the non-random unit groups appear in the corpus of items; and generate a unit group dictionary that includes at least a portion of the plurality of non-random unit groups and corresponding discount factors.

11. The non-transitory computer-readable storage medium of claim 10, wherein each of the plurality of non-random unit groups include at least two units.

12. The non-transitory computer-readable storage medium of claim 10, wherein each item of the corpus of items include at least one of a representation, an object identifier, a set, or a user.

13. The non-transitory computer-readable storage medium of claim 10, wherein the units of the non-random unit groups each include at least one of a character, a word, a symbol, or a number.

14. The non-transitory computer-readable storage medium of claim 10, wherein the joint probability is determined based at least in part on a number of times the units of the unit group appear together in the corpus of items.

15. The non-transitory computer-readable storage medium of claim 10, wherein the probability is determined based at least in part on a number of times the units of the unit group appear independently in the corpus of items.

16. The non-transitory computer-readable storage medium of claim 10, wherein determining a discount factor further includes determining a quotient of the number of times the non-random unit groups appear in the corpus of items and a number of items in the corpus of items.

17. The non-transitory computer-readable storage medium of claim 10, wherein the instructions, that when executed by the one or more processors, further cause the one or more processors to at least:

exclude from the unit group dictionary at least one non-random unit group with a corresponding discount factor that exceeds a threshold.

18. The non-transitory computer-readable storage medium of claim 10, wherein the instructions, that when executed by the one or more processors, further cause the one or more processors to at least:

determine at least one pre-defined unit group from the plurality of non-random unit groups; and exclude the at least one pre-defined unit group from the unit group dictionary.

* * * * *